United States Patent [19]
Copley et al.

[11] Patent Number: 6,075,854
[45] Date of Patent: Jun. 13, 2000

[54] FULLY FLEXIBLE ROUTING SERVICE FOR AN ADVANCED INTELLIGENT NETWORK

[75] Inventors: Jeffrey D. Copley, Garland; John Whited, Richardson; Marcus V. Brown, Jr.; Pardeep Kohli, both of Plano, all of Tex.

[73] Assignee: Alcatel USA Sourcing, L.P., Plano, Tex.

[21] Appl. No.: 09/208,192

[22] Filed: Dec. 8, 1998

Related U.S. Application Data

[60] Provisional application No. 60/067,998, Dec. 9, 1997.

[51] Int. Cl.[7] .................................................. H04M 3/42
[52] U.S. Cl. ........................ 379/211; 379/201; 379/207
[58] Field of Search .................................. 379/211, 201, 379/207, 219, 220, 221

[56] References Cited

U.S. PATENT DOCUMENTS

| | | | |
|---|---|---|---|
| 5,329,578 | 7/1994 | Brennan et al. | 379/201 |
| 5,553,130 | 9/1996 | Turner | 379/220 |
| 5,694,463 | 12/1997 | Christie et al. | 379/230 |
| 5,832,059 | 11/1998 | Aldred et al. | 379/127 X |
| 5,923,745 | 7/1999 | Hurd | 379/207 X |

FOREIGN PATENT DOCUMENTS

| | | | |
|---|---|---|---|
| 0559979 | 9/1993 | European Pat. Off. | H04Q 3/64 |
| 9733418 | 9/1997 | WIPO | H04M 1/56 |

*Primary Examiner*—Creighton Smith
*Attorney, Agent, or Firm*—Baker Botts L.L.P.

[57] ABSTRACT

A method of routing a call includes receiving a number of dialed digits entered by a caller, the dialed digits including a called party number, recognizing the called party number as a subscriber to a fully flexible routing service, obtaining a call plan having at least one predetermined routing feature for the subscriber, process the call according to the at least one predetermined routing feature in the call plan, determining a destination number according to the at least one routing features in the call plan, and routing the call to the destination number.

33 Claims, 9 Drawing Sheets

FULLY FLEXIBLE ROUTING SERVICE FOR AN ADVANCED INTELLIGENT NETWORK

RELATED APPLICATIONS

This application claims the benefit of U.S. Provisional Application Serial No. 60/067,998 filed Dec. 9, 1997.

TECHNICAL FIELD OF THE INVENTION

This invention is related in general to the field of telecommunications. More particularly, the invention is related to a fully flexible routing service for an advanced intelligent network (AIN).

BACKGROUND OF THE INVENTION

With the advent of the advanced intelligent network (AIN), it has become possible to rapidly design and introduce many new enhanced telecommunications services that provide added flexibility and convenience in how we use our telephone equipment.

The advanced intelligent network typically includes switches or service switching points (SSPs) coupled to signal transfer points (STPs), which are in turn coupled to service control points (SCPs). The interconnections between service switching points and service control points employ the signalling system number 7 or SS7 protocol for sending query messages associated with the execution of services. The service control points executes service logic programs which define the services and further store and maintain databases that have data associated with the services. The service control points are further coupled to a service management system (SMS), which supports the operations, administrations, management, and provisioning (OAM&P) needs of the network. The advanced intelligent network further includes intelligent peripherals, which are coupled to service switching points and the service management system, and provide pre-recorded voice announcements, voice synthesis, and other functionalities that generally facilitate interaction with service subscribers and customers. The connection between the service management system and other network nodes is typically via X.25 links. In the advanced intelligent network, telecommunications services are typically defined in a service creation environment (SCE) node by the service provider and then relayed to the service management system, which disseminates the service logic programs to the rest of the network for execution.

The International Telecommunications Union (ITU) and other standard setting bodies have promulgated recommendations and requirements for advanced intelligent network services. However, these standards do not spell out how this service is to be implemented and the specific service features that support these services.

SUMMARY OF THE INVENTION

Accordingly, there is a need for a fully flexible routing service for the advanced intelligent network.

In one aspect of the invention, a method of routing a call includes receiving a number of dialed digits entered by a caller, the dialed digits including a called party number, recognizing the called party number as a subscriber to a fully flexible routing service, obtaining a call plan having at least one predetermined routing feature for the subscriber, process the call according to the at least one predetermined routing feature in the call plan, determining a destination number according to the at least one routing features in the call plan, and routing the call to the destination number.

In another aspect of the invention, a fully flexible method of routing a call to a service subscriber includes obtaining a call plan having a plurality of routing features designed for the subscriber, obtaining a PRI for the subscriber, process the call according to the plurality of routing features in the call plan and obtaining a DNIS, and routing the call to a destination number in response to the PRI and DNIS.

In yet another aspect of the invention, a fully flexible method of routing a call to a service subscriber includes obtaining a call plan having a plurality of routing features designed for the subscriber, obtaining a PRI for the subscriber, and process the call according to the plurality of routing features in the call plan and obtaining a DNIS. The call plan comprises determining a tentative DNIS in response to the time of the call, determining a tentative DNIS in response to the geographic location of the caller, and determining a tentative DNIS in response to a predetermined call distribution scheme. The call is then routed to a destination number in response to the PRI and tentative DNIS.

BRIEF DESCRIPTION OF THE DRAWINGS

For a better understanding of the present invention, reference may be made to the accompanying drawings, in which.

DETAILED DESCRIPTION OF THE INVENTION

Figure 1:
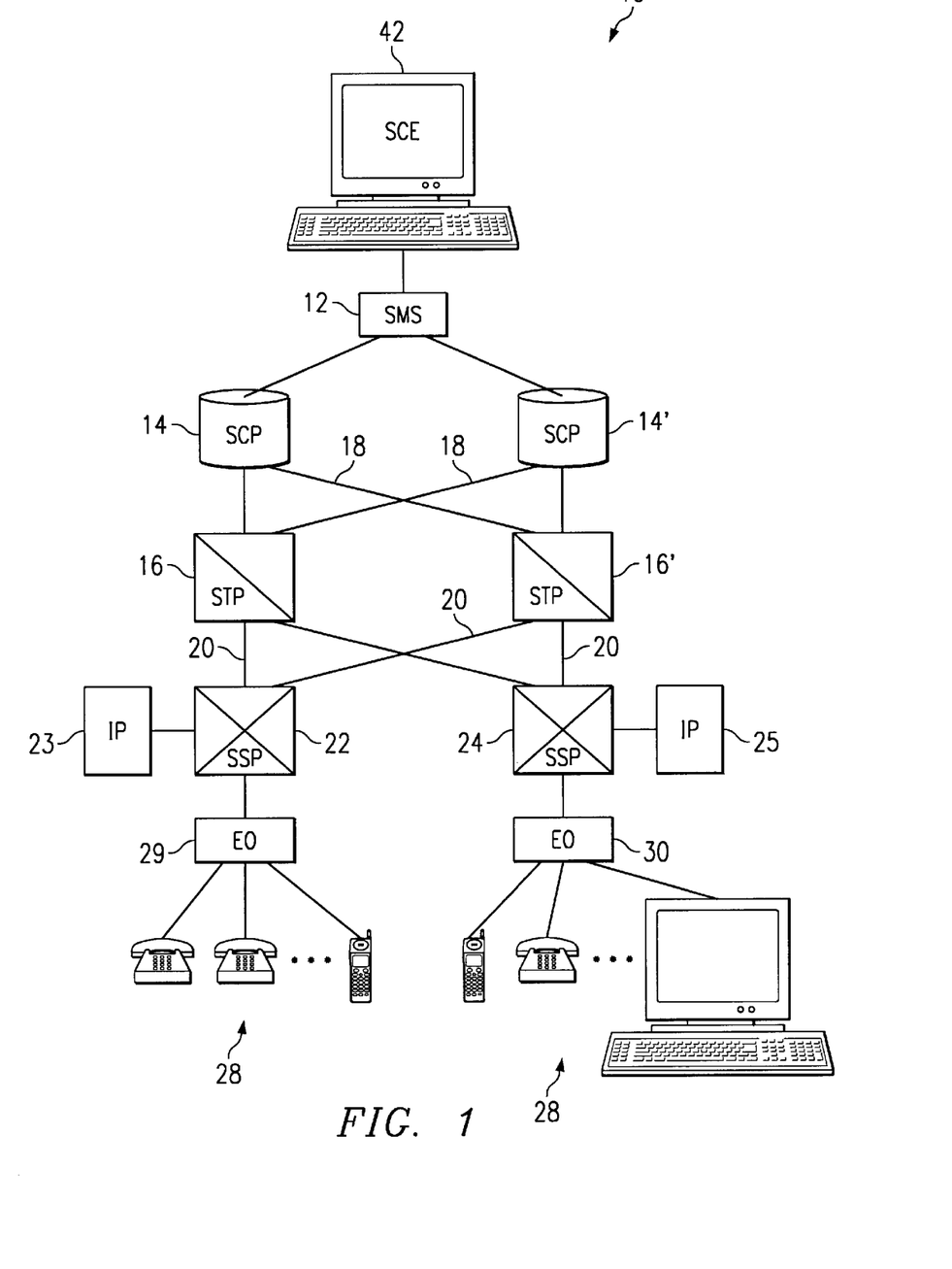
FIG. 1 is a simplified block diagram of an advanced intelligent network (AIN) having a virtual private network service.

Referring to FIG. 1, a simplified block diagram of an exemplary advanced intelligent network (AIN) is shown. FIG. 1 shows an exemplary telecommunications network 10 such as an advanced intelligent network (AIN) or intelligent network (IN). Network 10 includes a service management system (SMS) 12 which interfaces with a service control point (SCP) 14 and a signal transfer point (STP) 16 via an industry standard protocol such as X.25. Service management system 12 provides network information, database management, and administrative support for network 10. Service management system 12 generally interfaces with redundant service control points 14 and 14' for provisioning, database management, service control point application program management, and collecting traffic metering and measurement data. Service control points 14 and 14' are also directly linked to mated pair signal transfer points 16 and 16' via SS7 (signaling system number 7) link sets 18. An SS7 link set may include up to sixteen 56 or 64 Kbits/second links. Signal transfer points 16 and 16' are further coupled to one or more service switching points (SSPs) 22 and 24, via SS7 link sets 20, which perform the switching and call handling functions in the network. An intelligent peripheral (IP) 23 is coupled to service switching point 22 and another intelligent peripheral 25 is coupled to service switching point 24. Intelligent peripherals 23 and 25 may provide an interface to callers and users such as pre-recorded or voice synthesized announcements and prompts.

Service control points 14 and 14' are a transaction based processing system whose primary responsibility is to respond to queries from service switching points 22 and 24 for data needed to complete routing a call. Service switching points 22 and 24 are part of the public switched telephone network and are coupled to end offices (EO) 29 and 30, respectively, which are in turn coupled to the customer premises equipment (CPE) 28 of telephone service subscribers.

Network services are generally implemented in a service creation environment (SCE) 40 through a graphical user interface 42 to produce service logic programs that are then downloaded to network elements such as service management system 12, service control points 14 and 14', and/or signal transfer points 16 and 16', where they are executed.

Fully flexible routing service may include a premium rate service which provides number service translation and features used by subscribers for access to special services. In a premium rate service, the calling party (i.e., the caller) pays for the access call and the service provided. Subscriber services offered to the calling party are left up to the imagination and creativity of the subscriber. These services are facilitated using features such as recorded message access, live operator access, facsimile access, and data on demand. In addition to service access, Premium rate service offers a comprehensive set of service features. For example, intelligent routing selection from multiple destinations may be supported so that the routing information returned from a service query may contain location sensitive information used to reduce long distance costs and improve service. Alternatively, the information returned may be time sensitive, thus allowing some service provider centers to close while maintaining service from he open centers. Further, access to any premium rate service number may be suspended, or the number of calls in progress to a premium rate service number may be limited.

Premium rate service ties a network destination number to a premium rate number. The premium rate number is what the customer dials to access a premium rate service. When a premium rate number is received at the service switching point, the service switching point initiates a premium rate service query that is immediately forwarded to the service control point. The service control point then obtains the routing, caller, and subscriber information needed to initiate the premium rate service. With this information, the caller is routed to the appropriate destination such as the intelligent peripheral, which provides service access and billing.

Premium rate service query processing begins with One Number, which obtains the basic subscriber record. All other access and routing features are optional and may be tailored to the particular needs of the service subscriber. The premium rate service may include the following service features:

1. One Number
2. Time Dependent Routing
3. Origin Dependent Routing
4. Call Distribution
5. Call Limiter
6. Call Gapping
7. Call Logging
8. Customized Recorded Announcements
9. Customer Profile Management
10. Authentication
11. Premium Charging
12. Billing
13. IN/1 Based Support One Number provides the service user the ability to advertise a single number for customer access. This is accomplished by straight translation from the premium rate number to a network destination number (i.e., the called party number). One Number allows the service user to move into another serving area without changing the advertised number. The move is accomplished by mechanized, customer controlled, or manual update of the Premium Rate database.

After the service control point validates the service request, the service control point determines the routing number of where to route the call. The result returned may be a network address or routing information for forwarding the call to the appropriate network. With either result, the service control point translates based on the time of day, day of week, or date. The translation may result in an announcement indicating that the service is not available at this time.

Origin Dependent Routing provides the resultant destination number of a Premium rate service translation based on geographic location. This is done by first identifying an associated area, then performing the translation using the associated area indicator. The associated area comprises of the first few digits of the calling party's number (for example, the calling party's NPA may be used).

Call Distribution provides the capability to translate premium rate service numbers to the next destination number in a list of destination numbers. A user modifiable control list is provided that is used to perform the desired distribution of calls to the destination numbers on the list. The control list, for example, may contain four entries. The entries may indicate a ration of five, three, four, and eight. In this example, the first destination number receives five calls for every twenty calls. The second destination number receives three calls for every twenty calls. The third destination number receives four calls for every twenty calls and the fourth destination number receives eight calls for every twenty calls. Note that twenty is used in this example. This is because it is a sum of the four entries (i.e., 5+3+4+8=20).

Call Gapping provides the ability to restrict the number of premium rate calls placed. Call Gapping is deployed during periods of high traffic volume to the service control point for purposes of preventing service control point congestion. If Call Gapping controls have been initiated by the service control point, the service switching point responds by providing final call treatment.

Call Limiter counts the number of calls to a premium rate number in a specified period of time. If the number of calls exceeds a threshold in the data base, each call exceeding the threshold is routed to an announcement. When the specified time period expires, the number of calls is reset to zero.

The call logging service feature allows for a peg-count information to be incremented for each customer transaction at the service control point. Call duration information is kept and logged at the service switching point. Call Logging information is retrievable via the service management system.

The customized recorded announcement service feature allows a call to be completed to a terminating Customized Recorded Announcement instead of a customer line. The customer, via Customer Profile Management, may define different announcements for unsuccessful call completions due to fifteen different reasons (e.g. caller outside business hours, all lines are busy). The result of a Premium rate service translation may be a Customized Recorded Announcement. Depending on the condition causing the announcement request, the announcement may be 1) a customized announcement that can be changed by the premium rate subscriber, 2) a customized announcement that cannot be changed by the premium rate subscriber, 3) an announcement specialized for premium rate, or 4) a general system announcement.

All management of the customer's premium rate service are provided from a centralized location. The customer's premium rate profile includes information for support of billing and administration as well as information needed by the network to support call set-up. Distribution of information to various network subsystems are automated.

The customer activates the service via the service management system. The activation can be accomplished via the network operator or via customer access at the service management system. The premium rate service is activated for a specific period of time. Once activated, the user community is notified of the service via broadcast facilities such as television or radio. The service management system activates the services via the service control point. Upon completion of the service, the service management system deactivates the service and collects the call counts. During the Service activation period, the service management system may poll for the call counts.

The authentication service feature allows for the verification that the customer is allowed to exercise certain options in a telephone network. In other words, the request made by the customer is authentic and should be granted. For applicability to this service, the customer uses authentication to access their Customer Profile Management.

Premium Charging is the basic concept behind premium rate. This service feature allows for the pay back of the cost of a call to the called party, when the called party is considered as a value added service provider.

The service switching point generates a call detail record (CDR) for each premium rate call. These CDRs can be analyzed by other operations support systems to produce the premium rate bill. The Premium rate service writes an automatic message accounting (AMA) record for each call.

IN/1 Based Support is a US only protocol capability that supports network deployments that have not converted, or are in the process of converting, Toll-Free Service from IN/1 to AIN. IN/1 Based Support permits interworking between both service capabilities. This allows a network to convert to the advantages and enhanced services of an AIN while still maintaining interfaces to IN/1 deployments.

Figure 2:
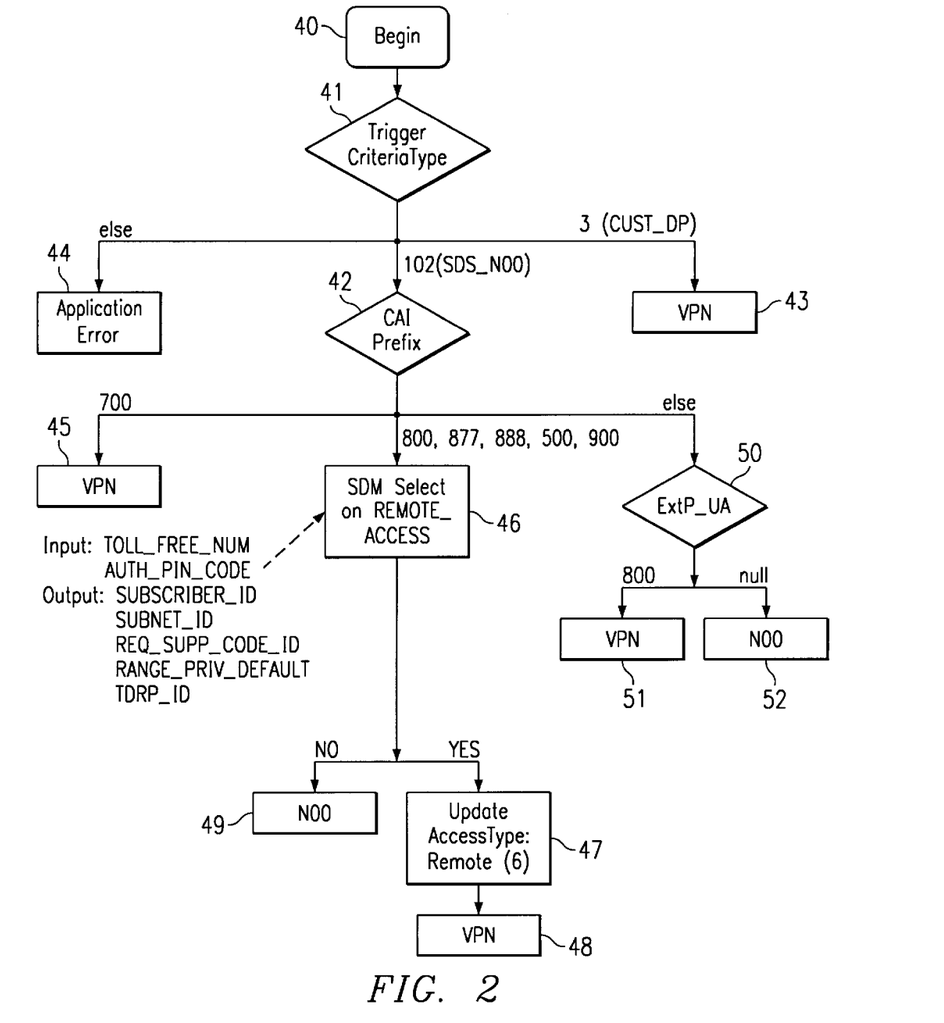
FIG. 2 is a flowchart of an embodiment of a main logic flow according to the teachings of the present invention.

FIG. 2 is a flowchart of an embodiment of a main logic flow according to the teachings of the present invention. The process flow begins in block 40, and in block 41, the trigger criteria type is determined. The trigger criteria type may be 102 or 3. If the trigger criteria type is 102, then a CAI (collected address info) prefix is determined in block 42. If the trigger criteria type is 3, then a custom dialing plan is indicated, which leads to the beginning of virtual private network service, as shown in block 43.

If in block 42 it is determined that the collected address info prefix is 700, then virtual private network processing begins, as shown in block 45. If the collected address info prefix is 800, 877, 888, 500, or 900, then in block 46 a REMOTE_ACCESS table is accessed. Inputs or keys to access the REMOTE_ACCESS table may include TOLL_FREE_NUM and AUTH_PIN_CODE, and information derived from this table may include SUBSCRIBER_ID, SUBNET_ID, REQ_SUPP_CODE_ID, REQ_SUPP_CODE_ID, RANGE_PRIV_DEFAULT, and TDRP_ID. All variables referred to herein are defined in Appendix A below. If the output indicates a remote access type, then the access type is updated to remote in block 47 and virtual private network processing begins in block 48. If the access type is not remote, then N00 or a number translation process begins in block 49. If the collected address info prefix is something other than 700, 800, 877, 888, 500, or 900, then Extp_UA or universal access 800 remote number is determined in block 50. If an 800 remote number is determined, then virtual private network service processing begins in bloc, 51. Otherwise, N00 service process begins in block 52.

Figure 3A:
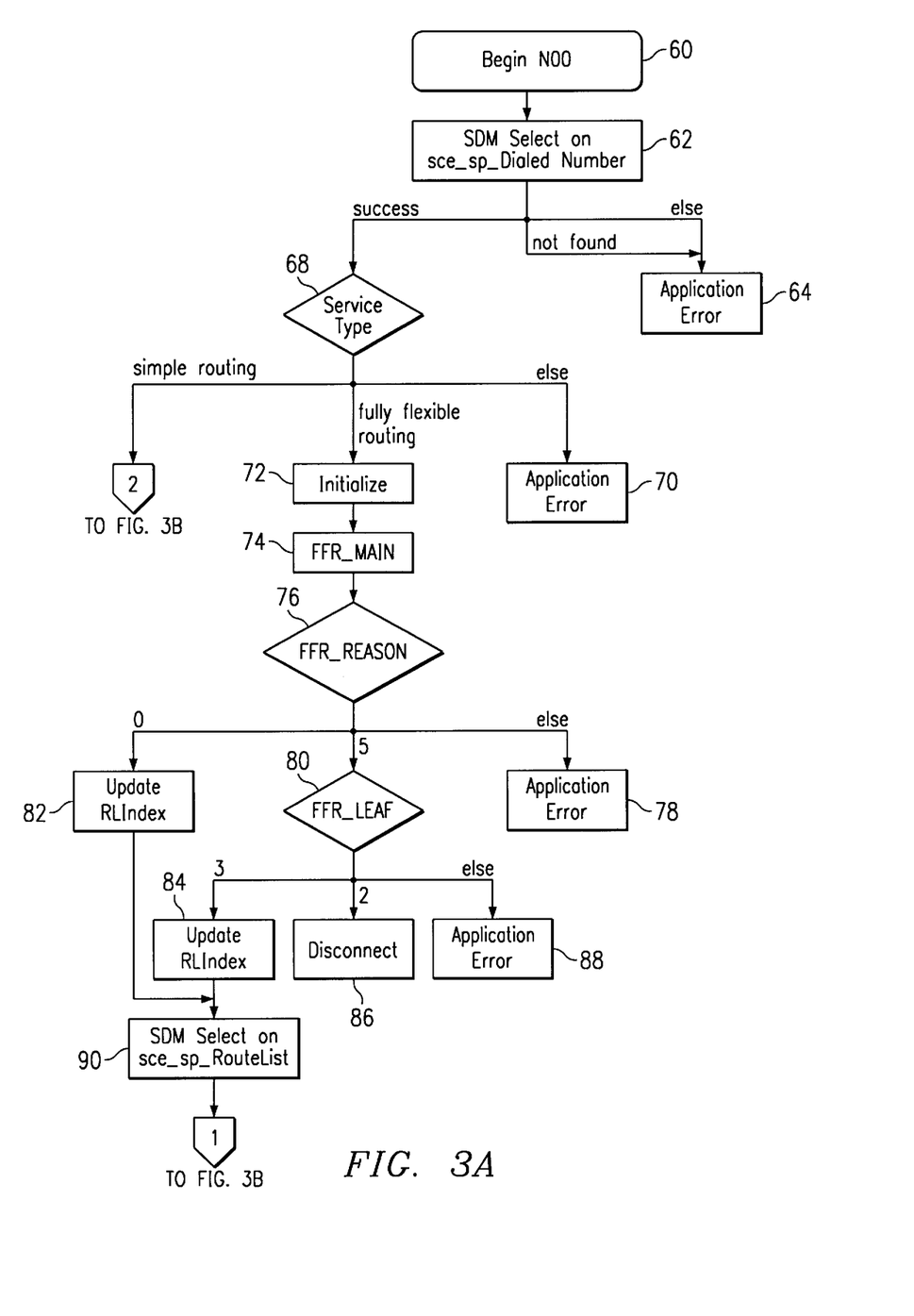
FIGS. 3A and 3B are a flowchart of an embodiment of an N00 (NXX number translation) process flow according to the teachings of the present invention.
Figure 3B:
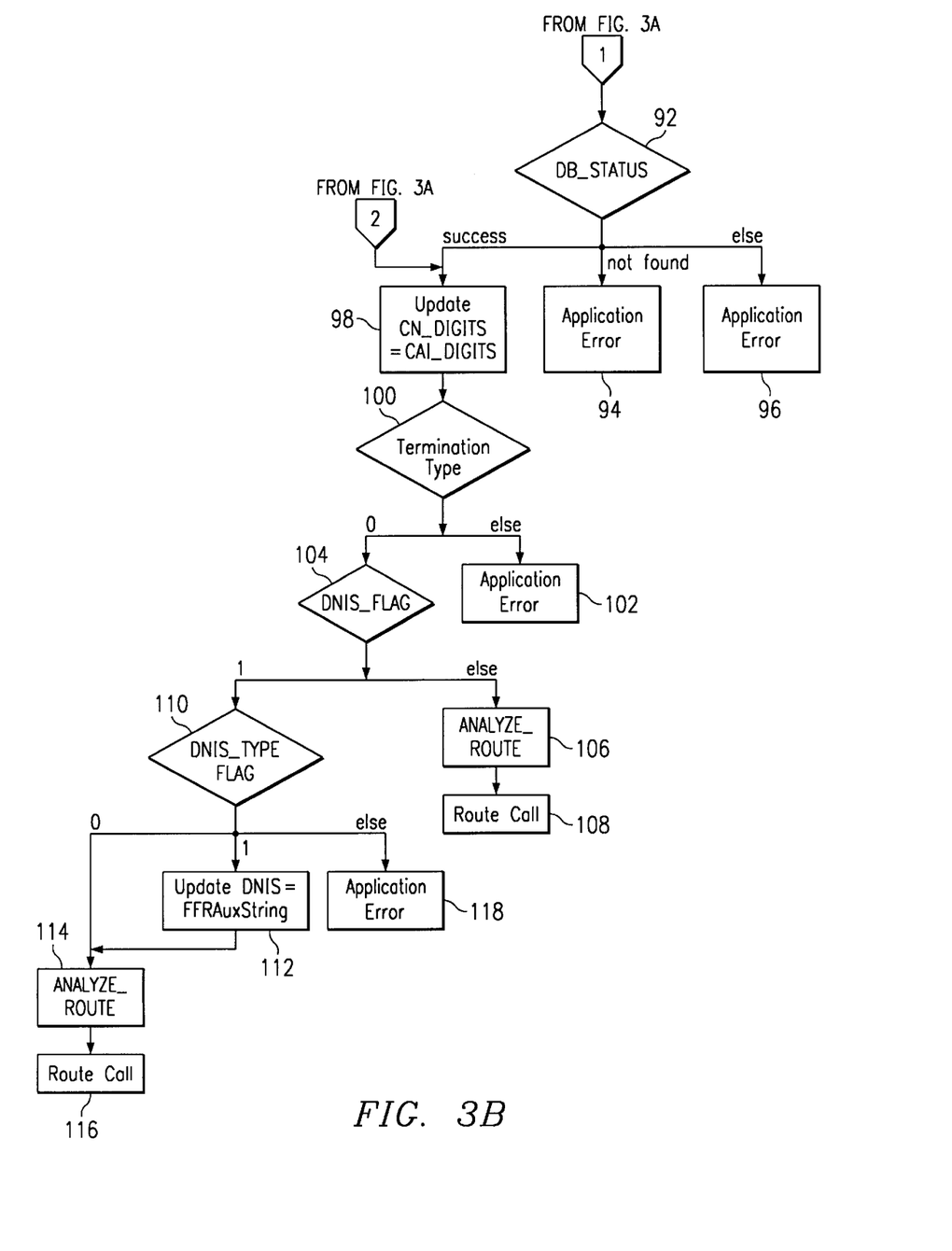
Figure 4:
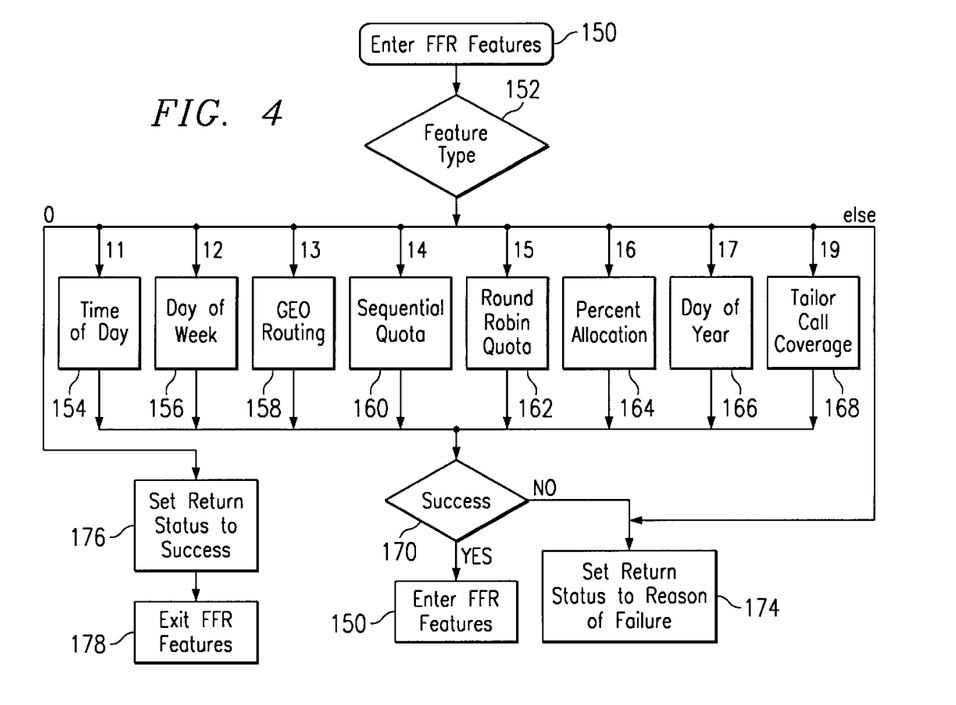
FIG. 4 is a flowchart of an embodiment of the fully flexible routing process according to the teachings of the present invention.

FIGS. 3A and 3B are a flowchart of an embodiment of an N00 top level process to perform number translation according to the teachings of the present invention, which begins in block 60. In block 62, an SDM select on sce_sp_DialedNumber is performed. Stored procedure sce_sp_DialedNumber is executed to find the dialed number in the Call_DN table (see Appendix A) and in case of simple routing also the Call_routeList table to obtain termination information. The dialed number is used to identify a call plan in the Call_DN table, which is uniquely identified by superRoutindex, and to identify the first feature in the call plan, which is identified by firstindex. A call plan may be defined as a predetermined set of routing features. If the dialed number is not found or some condition other than that the dialed number is successfully found, then an application error has occurred and appropriate steps are taken to handle the error in block 64, such as setting a particular field or parameter of a returned TCAP message to indicate an error. If the dialed number is successfully located in the Call_DN table, then the service type of the call is determined in block 58. Ther service type is a value obtained from the Call_DN table which may indicate whether simple routing or fully flexible routing is desired. In block 70, an application error is handled if the service type indicates anything other than simple routing, fully flexible routing, or some other predetermined routing logic. In case of fully flexible routing, initialization of variables or parameters is performed in block 72. In block 74, a main logic process for fully flexible routing (FFR) is executed (FIG. 4). Fully flexible routing determines a translated destination number according to a set of routing features, such as time of day, day of week, day of year, geographical routing, sequential, round robin, percent allocation, etc. FFR_MAIN 74 returns an FFR_

REASON variable, the value of which is determined in block 76. The value of FFR_REASON is indicative of whether a fully flexible routing feature was successfully executed. If not, an application error has occurred, as shown in block 78. If the values of FFR_REASON and FFR_LEAF (block 80) indicate that the database access was successful and that default conditions are to be used, then RLIndex is updated accordingly in blocks 82 and 84. The value of FFR_LEAF may also indicate that the call is to be disconnected, as shown in block 86 or an application error has occurred, as shown in block 88.

In block 90, an SDM select on sce_sp_RouteList is performed to access a Call_routeList table (Appendix A). The superRoutindex and RLIndex are used as inputs to the stored procedure or as keys to access the table. The procedure returns a translated NXX number or PRI, termination type, switch identifiers and trunk group identifiers, etc. This information is used to route the call. In block 92, whether the table or dabase access was successful is determined by the value of DB_STATUS. If the proper entry is not found or some other error condition, an application error has occurred and handled appropriately, as shown in block 94 and 96. Otherwise, if CN_DIGITS is NULL, then CN_DIGITS or charge number is set to the collected address information (CAI_DIGITS) so that the cost of the call is charged to the called party in block 98. In block 100, the termination type is determined. Termination type is obtained as the value of termination_type obtained from the Call_routeList table. Presently, the only supported type of termination is IN/1 and other types are not supported. Therefore, any value other than the one indicative of IN/1 generates an application error, as shown in block 102. In block 104, the value of DNIS_FLAG is determined. This flag is obtained form the Call_DN table and indicates whether PRI (primary rate interface) overlay with DNIS (dialed number identification) is to be performed. In other words, whether the PRI should be modified with the DNIS to obtain the destination number. If not, then the analyze_route messge is sent to the service switching point and the call is routed in blocks 106 and 108. Otherwise, the value of DNIS_TYPE_FLAG is determined in block 110 which determine whether the DNIS should be the value obtained from the Call_DN table or the value obtained from the feature table. If the DNIS_TYPA_FLAG indicates that the DNIS value is from the feature table, the DNIS is updated to equal to FFRAuxString in block 112, which has the value of the DNIS from the feature table, prior to sending the analyze_route message and routing the call in blocks 114 and 116. If the DNIS_TYPE_FLAG is some other unrecognized value, then the application error is handled in block 118.

FIG. 4 is a flowchart of an embodiment of the fully flexible routing process according to the teachings of the present invention. In block 150, a call plan consisting of a set of identified routing features has been identified and fully flexible routing is entered to determine the destination. In block 152, the feature type is determined. Feature type is indicated by firstfeatureType in the Call_DN table or the nextfeatureType in the other feature tables. The feature type identifies what fully flexible routing feature is to be processed, which may include time of day (block 154), day of week (block 156), geographic (block 158), sequential quota (block 160), round robin quota (block 162), percent allocation (block 164), day of year (block 166) and tailored call coverage (block 168). Time of day, day of week and day of year are routing schemes that are based on the time of the call. Geographic routing is based on the geographical location of the caller. Sequential quota routing scheme allows the calls to be routed to one call center until it reaches a predetermined load and then calls are routed to the next call center and subsequent call centers in the same manner. The round robin routing scheme distributes calls evenly among a number of call centers. The percent allocation routing scheme routes calls to call centers based on preassigned percentages to the call centers. The tailored call coverage may provide other enhanced or a combination of enhanced routing features. Details of these routing schemes are described below. In block 170 it is determined whether the current routing scheme was performed successfully. If yes, execution loops back to block 150 to process the next feature. If the current feature was not successfully carried out, then return status is set to reflect the reason the process failed, as shown in block 174. In block 152, feature type may have a value indicating that the end of the call plan is reached and all the features have been determined. At this pint, the return status is set to reflect fully flexible routing success, as shown in block 176, and execution exits the fully flexible routing process.

Figure 5:
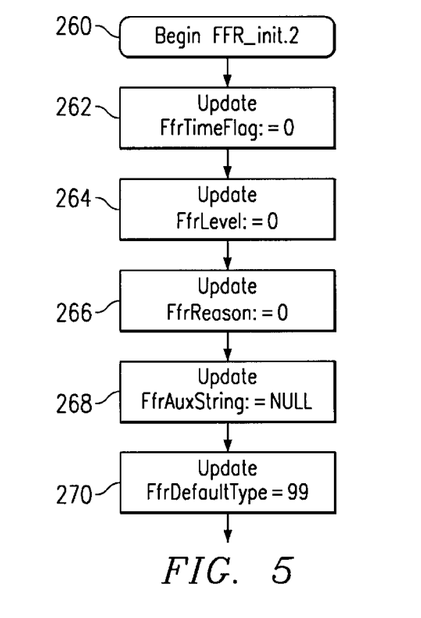
FIG. 5 is a flowchart of an embodiment of an intialization process according to the teachings of the present invention, which begins in block 260.

FIG. 5 is a flowchart of an embodiment of an intialization process according to the teachings of the present invention, which begins in block 260. In blocks 262–270, FfrTimeFlag, FfrLevel, FfrReason, FfrAuxString, and FfrDefaultType are set to predetermined values. FfrTimeFlag is a flag used to indicate whether the system time or current time of the call has been determined. FfrLevel is used to keep track how many fully flexible routing feature has been performed for a call. FfrReason is a variable used to reflect whether error conditions has occurred. FfrAuxString is a variable used to hold the current DNIS. FfrDefaultType is a flag indicating whether default conditions or settings for the features are to be used.

Figure 6:
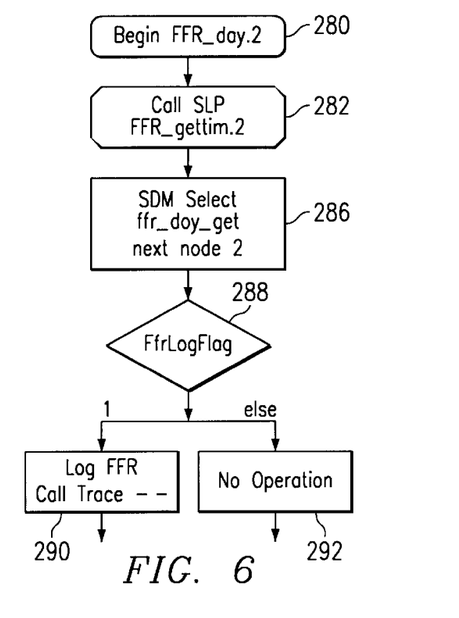
FIG. 6 is a flowchart of an embodiment of a FFR__day process according to the teachings of the present invention, which begins in block 280.

FIG. 6 is a flowchart of an embodiment of a FFR_day process according to the teachings of the present invention, which begins in block 280. FFR day process 280 determines a translation to a destination number depending on the day of year criteria. In block 282, service logic program (SLP) FFR_gettim (FIG. 9) is called. FFR_gettim obtains the current system time. In block 286, SDM select on ffr_doy_get_next_node_2 for day of year routing is performed. This stored procedure accesses the Ffr_Doy_Next_Node_Info_2 Table that contains a list of day of year entries. Each entry specifies a range in days where the current date is acceptable. Appendix A lists the tables and the parameters in the tables. In block 288, the value of FfrLogFlag is determined. If it is "1", then the routing and its parameters are logged, as shown in block 290; otherwise, no operation is performed, as shown in block 292.

Figure 7:
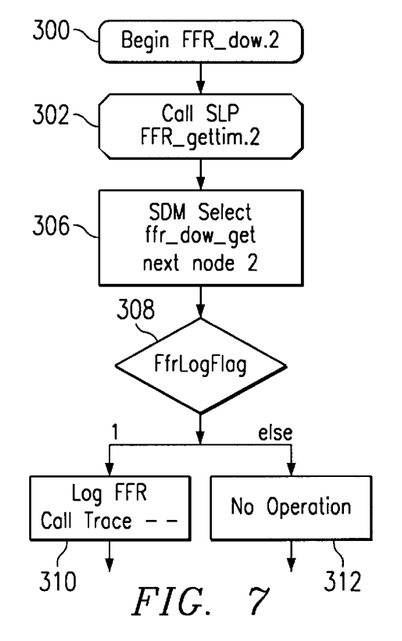
FIG. 7 is a flowchart of an embodiment of a FFR__dow process according to the teachings of the present invention, which begins in block 300.

FIG. 7 is a flowchart of an embodiment of a FFR_dow process according to the teachings of the present invention, which begins in block 300. FFR_dow process 300 determines a translation to a destination number depending on the day of week criteria. In block 302, service logic program (SLP) FFR_gettim (FIG. 9) is called. FFR_gettim obtains the current system time. In block 306, SDM select on ffr_dow_get_next_node_2 for day of week routing is performed. This stored procedure accesses the Ffr_Dow_Next_Node_Info_2 Table that contains a list of day of week entries. Each entry specifies a range in days of the week where the current date is acceptable. In block 308, the value of FfrLogFlag is determined. If it is "1", then the routing is logged, as shown in block 310; otherwise, no operation is performed, as shown in block 312.

Figure 8:
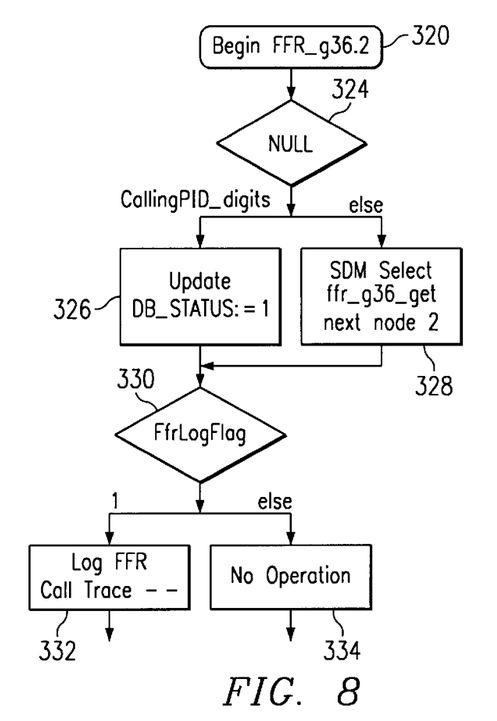
FIG. 8 is a flowchart of an embodiment of a FFR__g36 process according to the teachings of the present invention, which begins in block 320.

FIG. 8 is a flowchart of an embodiment of a FFR_g36 process according to the teachings of the present invention, which begins in block 320. FFR_g36 process 320 determines a translation to a destination number depending on the day of year criteria. In block 324, it is determined whether CallingPID_digits is NULL. If NULL, in block 326, the DB_STATUS is set to "1" to indicate the calling party's identifier was not found. Otherwise in block 328, an SDM select on ffr_g36_get_next_node_2 for geographical routing is performed. This stored procedure accesses Ffr_G36_Next_Node_Info_2 Table that contains a list of allowed geographic routing entries. Each entry specifies a geographic location. The locations may be specified in terms of NPA, NPA-NXX, or NPA-NXX-XXXX, for example. In block 330, the value of FfrLogFlag is determined. If it is "1", then the routing is logged, as shown in block 332; otherwise, no operation is performed, as shown in block 334.

Figure 9:
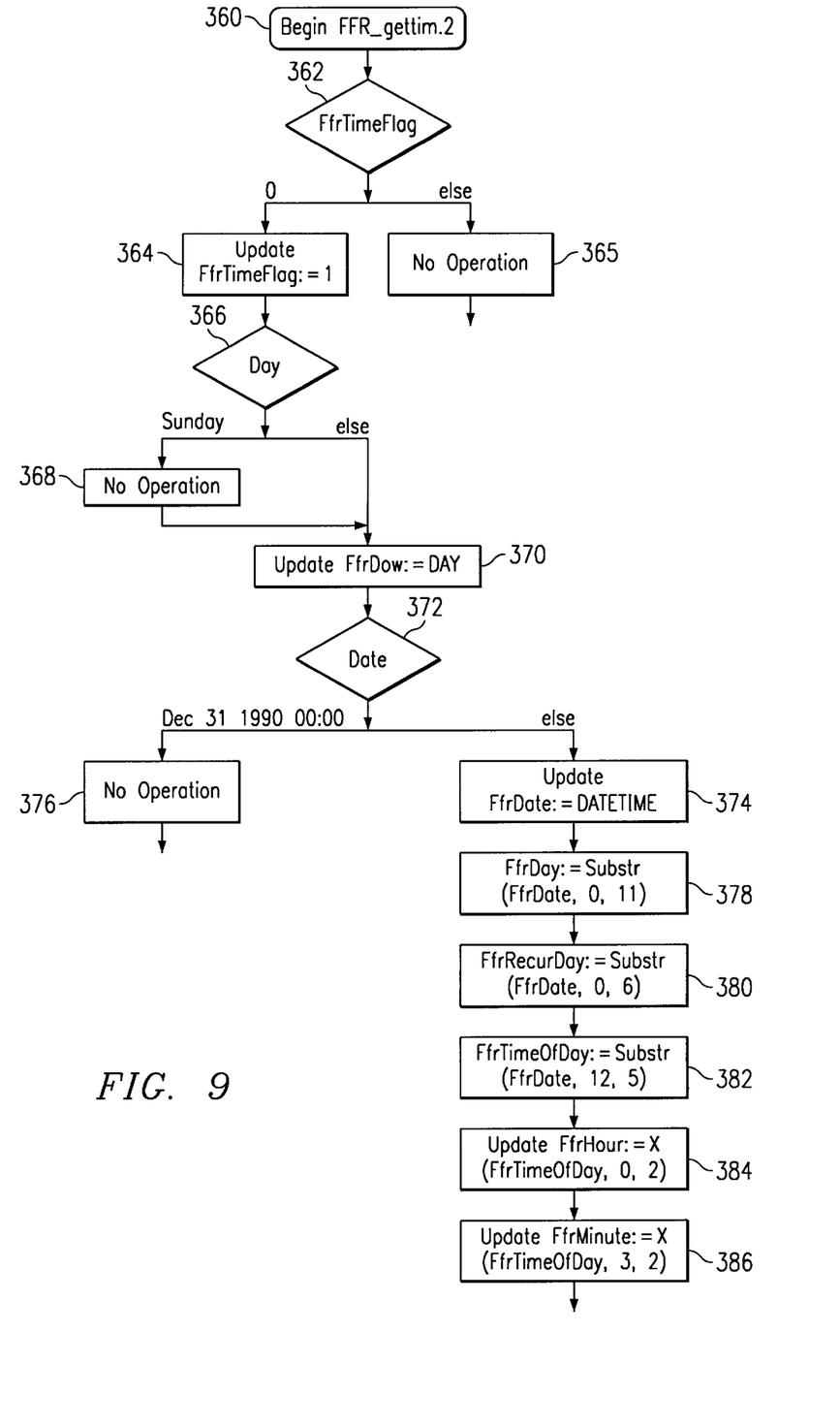
FIG. 9 is a flowchart of an embodiment of an FFR__gettim service logic program according to the teachings of the present invention.

FIG. 9 is a flowchart of an embodiment of an FFR_gettim service logic program according to the teachings of the present invention. FFR_gettim begins in block 360. In block 362, the value of FfrTimeFlag is determined. If the flag indicates the current system time has already been obtained, then no operation is carried out, as shown in block 365. If the flag indicates the current system time has not been obtained for the current call, then in block 364, the FfrTimeFlag is reset. In block 366, the current day of week is determined. If the day of week is Sunday, then no operation is performed, as shown in block 368. Otherwise, Ffrdow is updated to the current day of week in block 370. In block 372, the current date and time are determined. If the current date and time is of a predetermined value, then no operation is performed, as shown in block 376. Otherwise, the FfrDate variable is set to the current date and time in block 374. In blocks 378–386, a number of variables are set to reflect the current time, day of week, and date.

Figure 10:
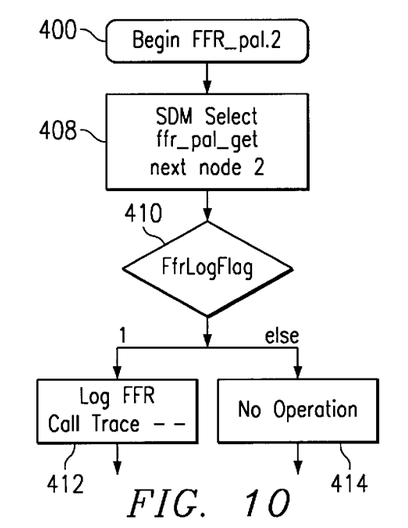
FIG. 10 is a flowchart of an embodiment of a FFR__pal service logic program according to the teachings of the present invention.

FIG. 10 is a flowchart of an embodiment of a FFR_pal service logic program according to the teachings of the present invention. FFR_pal 400 is a process used to determine routing based on a predetermined percentage allocation criteria. A service subscriber may assign a call load percentage value to each of the subscriber's call centers so that the calls may be routed or distributed to the call centers according to the assigned percentage allocation. In block 408, SDM select on ffr_pal_get_next_node_2 is performed. This stored procedure accesses an Ffr_Pal_Next_Node_Info_2 table which contains a list of percent allocation entries. Each percent allocation entry specifies a percentage point which determines what percentage of calls are to be routed to each call center or destination. In block 410, the value of FfrLogFlag is determined. If it is "1", then the routing is logged, as shown in block 412; otherwise, no operation is performed, as shown in block 414.

Figure 11:
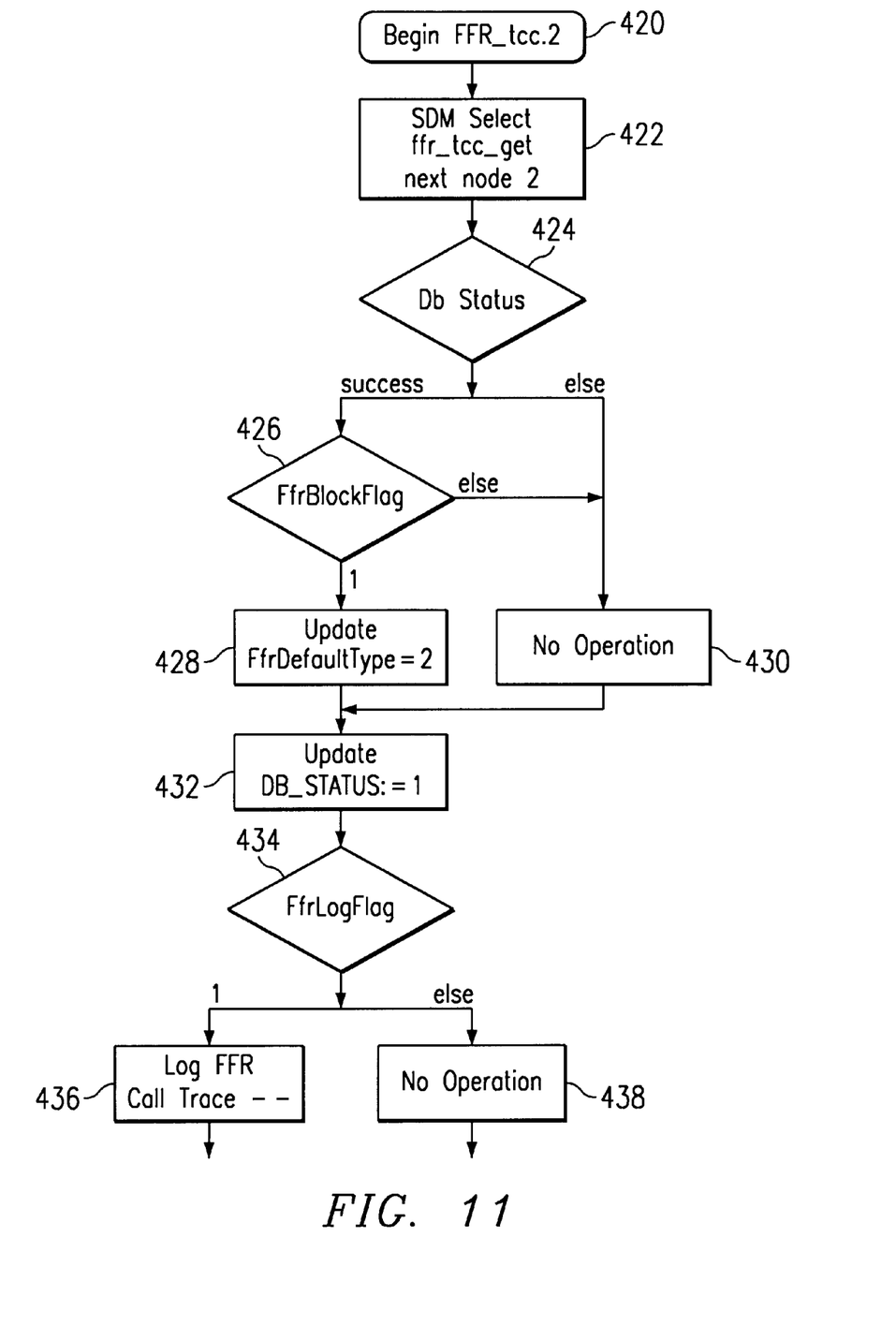
FIG. 11 is a flowchart of an embodiment of an FFR__tcc service logic program 420 according to the teachings of the present invention.

FIG. 11 is a flowchart of an embodiment of an FFR_tcc service logic program 420 according to the teachings of the present invention. In block 422, SDM select on ffr_tcc_get_next_node_2 is performed. This stored procedure accesses an Ffr_Tcc_Next_Node_Info_2 table, which contains a list of blocked geogrpahic routing entries. Each entry specifies a geographic region that the calls cannot be routed. The locations may be specified in terms of NPA, NPA-NXX, or NPA-NXX-XXXX, for example. In block 424, it is determined whether the database access is successful. If successful, the value of the FfrBlockFlag is determined in block 426. If the database access is not successful or the block flag indicates the call is blocked, then no operation is performed, as shown in block 430. Otherwise, FfrDefaultType is set to a predetermined value, such as "2" to indicate that the call is to be disconnected, as shown in block 428. In block 432, the DB_STATUS variable is reset to "1". In block 434, the value of FfrLogFlag is determined. If it is "1", then the routing is logged, as shown in block 436; otherwise, no operation is performed, as shown in block 438.

Figure 12:
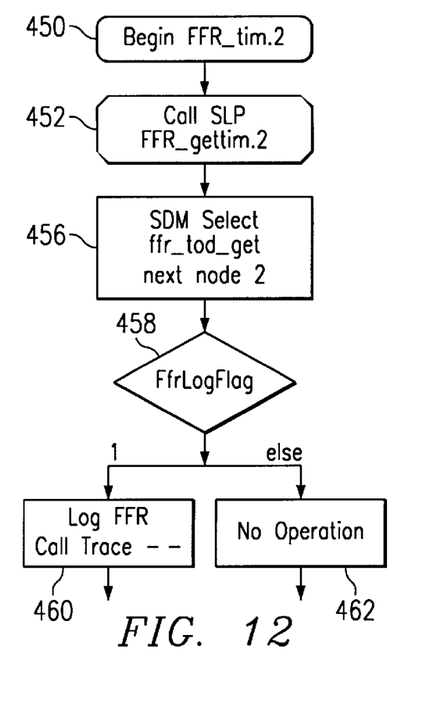
FIG. 12 is a flowchart of an embodiment of a FFR__tim process according to the teachings of the present invention, which begins in block 450.

FIG. 12 is a flowchart of an embodiment of a FFR_tim process according to the teachings of the present invention, which begins in block 450. FFR_tim process 450 determines a translation to a destination number depending on the time of day criteria. In block 452, service logic program (SLP) FFR_gettim (FIG. 9) is called. FFR_gettim is called to obtain the current system time. In block 456, SDM select on ffr_tod_get_next_node_2 for time of day routing is performed. This stored procedure accesses a table that contains a list of time of day entries. Each entry specifies a range in time where the current time is acceptable. Appendix A lists the tables and the parameters in the tables. In block 458, the value of FfrLogFlag is determined. If it is "1", then the routing is logged, as shown in block 460; otherwise, no operation is performed, as shown in block 462.

Figure 13:
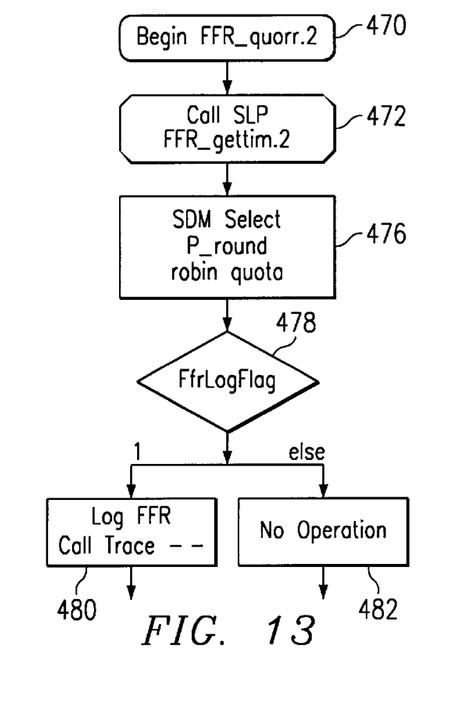
FIG. 13 is a flowchart of an embodiment of a FFR__quorr process according to the teachings of the present invention, which begins in block 470.

FIG. 13 is a flowchart of an embodiment of a FFR_quorr process according to the teachings of the present invention, which begins in block 470. FFR_quorr process 470 determines a translation to a destination number depending on a round robin routing criteria. The round robin routing criteria routes and distributes calls to a number of call centers evenly. Each call center may also be assigned a quota so that a call center reaching its quota is taken outof the round robin distribution pool until its call load drops below the quota. In block 472, service logic program FFR_gettim (FIG. 9) is called. FFR_gettim obtains the current system time. In block 476, SDM select on p_ground_robin_quota for round robin quota routing is performed. This stored procedure accesses a table that contains a list of entries to support robin robin routing. Each entry contains the last call center serviced for a particular call plan feature. Appendix A lists the tables and the parameters in the tables. In block 478, the value of FfrLogFlag is determined. If it is "1", then the routing is logged, as shown in block 480; otherwise, no operation is performed, as shown in block 482.

Figure 14:
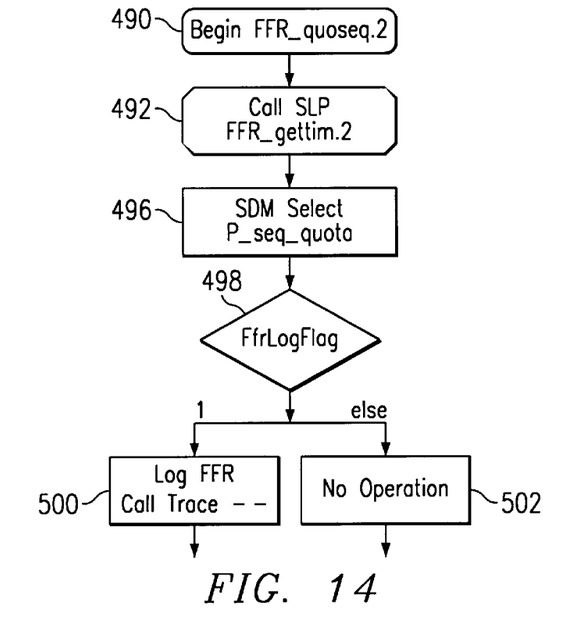
FIG. 14 is a flowchart of an embodiment of a FFR__quoseq process according to the teachings of the present invention, which begins in block 490.

FIG. 14 is a flowchart of an embodiment of a FFR_quoseq process according to the teachings of the present invention, which begins in block 490. FFR_quoseq process 490 determines a translation to a destination number depending on a sequential quota routing criteria which routes calls to the first available call center. Therefore, all calls are routed to a single call center until that call center reaches a predetermined quota. This routing scheme allows a subscriber to have secondary call centers that are not utilized until the primary call center reaches a busy or peak traffic time. In block 492, service logic program FFR_gettim (FIG. 9) is called. FFR_gettim obtains the current system time. In block 496, SDM select on p_seq_quota is performed. This stored procedure accesses a table that contains a list of quota entries to support sequential routing. Each entry specifies a particular call center that are available for accepting calls. Appendix A lists the tables and the parameters in the tables. In block 498, the value of FfrLogFlag is determined. If it is "1", then the routing is logged, as shown in block 500; otherwise, no operation is performed, as shown in block 502.

Constructed and operating in this manner, a call may be routed by a simple translation or by translation dependent on one or more routing criteria. The subscriber is thus able to design calling plans that are fully flexible to meet its needs.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

APPENDIX A

DATABASE TABLES
Primary key columns are bold and columns used for foreign keys are italicized.

Call_DN Table

| | |
|---|---|
| dialedNumber | NXX subscriber number |
| serviceFlag | indicates whether this service feature is on/off |
| serviceType | type of translation, i.e., simple or fully flexible routing |
| *firstindex* | if serviceType = 1, use this key with superRoutindex to index into Call_routeList table, else use with superRoutindex to index into feature table |
| *superRoutindex* | used to define a call plan; if serviceType = 1 use with firstindex to index into Call_routeList table, else use with firstindex to index into feature table |
| DefRLindex | used for default routing; combine with superRoutindex to index into Call_routeList table |
| dnis | used to overlay the translated number (pri from Call_routList) if dnisFlag ≠ 0 and dnisTypeFlag = 0 |
| dnisFlag | if dnisFlag = 0, no primary rate interface overloading with dnis |
| dnisTypeFlag | if dnisTypeFlag = 0 and overloading is required, use dnis from Call_DN; if dnisTypeFlag ≠ 0 and overloading is required, use dnis from feature table |
| firstfeatureType | indicates the first feature to use in the call plan:<br>0 - terminating routing<br>11 - time of day<br>12 - day of week<br>13 - geographica routing<br>14 - sequential quota<br>15 - round robin quota<br>16 - percent allocation<br>17 - day of year<br>19 - tailor call coverage |

Call_routeList Table

| | |
|---|---|
| superRoutindex | used to define a call plan |
| RLIndex | combine with the superRoutindex to identify unique route within call plan |
| pri | primary rate interface; translated NXX number for sendin back to the service switching point |
| termination_type | defines teh type of termination routing to apply:<br>0 - IN/1<br>1 - CAIN (carrier advanced intelligent network) dedicated<br>2 - CAIN switched |
| switch_Id | switch identifier number |
| trunkGroup | trunk group number |
| STS | service translation scheme |
| switch_Id1 | first alternate switch identifier |
| trunkGroup1 | first alternate trunk group identifier |
| switch_Id2 | second alternate switch identifier |
| trunkGroup2 | second alternate trunk group identifier |

Ffr_Doy_Next_Node_Info_2 Table

| | |
|---|---|
| superRoutindex | used to define a call plan |
| featureIndex | used to uniquely define this feature within a call plan |
| doyIndex | used to define a range of this feature within a call plan |
| *nextfeatureIndex* | used to uniquely define the next feature within a call plan |
| holiday | if holiday = 0, not a holiday; else use as an index into the holiday table |
| nextfeatureType | indicates the next feature to use in the call plan:<br>0 - terminating routing<br>11 - time of day<br>12 - day of week<br>13 - geographica routing<br>14 - sequential quota<br>15 - round robin quota<br>16 - percent allocation<br>17 - day of year<br>19 - tailor call coverage |
| startDate | starting date range |
| stopDate | stopping date range |
| timezone | used to specify an offset from the current time in one hour increments |
| auxOutputString | used to overlay the PRI if requested |

Call_holidays Table

| | |
|---|---|
| holidayIndex | used to uniquely define a set of holidays within a call plan |
| yearIndex | used to uniquely define a specific year of holidays |
| holidayDate | day of year |

Ffr_Dow_Next_Node_Info_2 Table

| | |
|---|---|
| superRoutindex | used to define a call plan |
| featureIndex | used to uniquely define this feature within a call plan |
| dowIndex | used to define a range of this feature within a call plan |
| *nextfeatureIndex* | used to uniquely define the next feature within a call plan |
| nextfeatureType | indicates the next feature to use in the call plan:<br>0 - terminating routing<br>11 - time of day<br>12 - day of week<br>13 - geographica routing<br>14 - sequential quota<br>15 - round robin quota<br>16 - percent allocation<br>17 - day of year<br>19 - tailor call coverage |
| startDate | starting date range |
| stopDate | stopping date range |
| timezone | used to specify an offset from the current time in one hour increments |
| auxOutputString | used to overlay the PRI if requested |

Ffr_Tod_Next_Node_Info_2 Table

| | |
|---|---|
| superRoutindex | used to define a call plan |
| featureIndex | used to uniquely define this feature within a call plan |

-continued

Ffr_Tod_Next_Node_Info_2 Table

| | |
|---|---|
| todIndex | used to define a range of this feature within a call plan |
| *nextfeatureIndex* | used to uniquely define the next feature within a call plan |
| nextfeatureType | indicates the next feature to use in the call plan:<br>0 - terminating routing<br>11 - time of day<br>12 - day of week<br>13 - geographica routing<br>14 - sequential quota<br>15 - round robin quota<br>16 - percent allocation<br>17 - day of year<br>19 - tailor call coverage |
| startDate | starting date range |
| stopDate | stopping date range |
| timezone | used to specify an offset from the current time in one hour increments |
| auxOutputString | used to overlay the PRI if requested |

Ffr_Pal_Next_Node_Info_2 Table

| | |
|---|---|
| superRoutindex | used to define a call plan |
| featureIndex | used to uniquely define this feature within a call plan |
| allocIndex | used to define a range of this feature within a call plan |
| *nextfeatureIndex* | used to uniquely define the next feature within a call plan |
| nextfeatureType | indicates the next feature to use in the call plan:<br>0 - terminating routing<br>11 - time of day<br>12 - day of week<br>13 - geographica routing<br>14 - sequential quota<br>15 - round robin quota<br>16 - percent allocation<br>17 - day of year<br>19 - tailor call coverage |
| setPoint | percentage |
| auxOutputString | used to overlay the PRI if requested |

Ffr_G36_Next_Node_Info_2 Table

| | |
|---|---|
| superRoutindex | used to define a call plan |
| featureIndex | used to uniquely define this feature within a call plan |
| *nextfeatureIndex* | used to uniquely define the next feature within a call plan |
| nextfeatureType | indicates the next feature to use in the call plan:<br>0 - terminating routing<br>11 - time of day<br>12 - day of week<br>13 - geographica routing<br>14 - sequential quota<br>15 - round robin quota<br>16 - percent allocation<br>17 - day of year<br>19 - tailor call coverage |
| ani | geographic number which may be NPA, NPA-NXX, or NPA-NXX-XXXX |
| auxOutputString | used to overlay the PRI if requested |

Ffr_Tcc_Next_Node_Info_2 Table

| | |
|---|---|
| superRoutindex | used to define a call plan |
| featureIndex | used to uniquely define this feature within a call plan |
| ani | geographic number which may be NPA, NPA-NXX, or NPA-NXX-XXXX |

Ffr Default_Feature Table

| | |
|---|---|
| superRoutindex | used to define a call plan |
| featureIndex | used to uniquely define this feature within a call plan |
| nextfeatureType | indicates the next feature to link to:<br>0 - terminating routing<br>11 - time of day<br>12 - day of week<br>13 - geographica routing<br>14 - sequential quota<br>15 - round robin quota<br>16 - percent allocation<br>17 - day of year<br>19 - tailor call coverage |
| defaultType | indicates the type of action to take:<br>0 - route to Call_RouteList<br>1 - route to next feature<br>2 - disconnect<br>3 - route to Call_routeList (use DefRLindex from Call_DN table with superRoutindex) |
| *defaultVal* | if defaultType = 0, use with superRoutindex to index into Call_routeList table;<br>if defaultType = 1, use with superRoutindex to index into the next feature |

Ffr_Quota_2 Table

| | |
|---|---|
| superRoutindex | used to define a call plan |
| featureIndex | used to uniquely define this feature within a call plan |
| quotaIndex | used to uniquely identify a particular call center |
| *nextfeatureIndex* | used to uniquely define the next feature within a call plan |
| nextfeatureType | indicates the next feature to link to:<br>0 - terminating routing<br>11 - time of day<br>12 - day of week<br>13 - geographic routing<br>14 - sequential quota<br>15 - round robin quota<br>16 - percent allocation<br>17 - day of year<br>19 - tailor call coverage |
| setPoint | quota; maximum number of calls allowed |
| callCount | total number of calls already serviced |
| periodLength | length of time period |
| startTime | starting time of current period |
| auxOutputString | used to overlay the PRI if requested |

RoundRobinQuota Table

| | |
|---|---|
| superRoutindex | used to define a call plan |
| featureIndex | used to uniquely define this feature within a call plan |
| currentPosition | used to specify the last call center that processed a call |

APPENDIX B

ACRONYMS

| | |
|---|---|
| AIN | Advanced Intelligent Network |
| ANI | Automatic Number Identification |
| CAI | Collected Address Info |
| CAIN | Carrier Advanced Intelligent Network |
| CDR | Call Detail Record |
| CSI | Call Station Identifier |
| DAL | Direct Access Line |
| DNIS | Dialed Number Identification |
| DOW | Day of Week |
| DTO | Direct Termination Overflow |
| ID | Identifier |
| IDDD | International Direct Distance Dialing |
| IN | Intelligent Network |
| IP | Intelligent Peripheral |
| IPR | Information Problem Report |
| LATA | Local Access Transport Area |
| NANP | North American Numbering Plan |
| NOA | Nature of Address |
| NPA | Numbering Plan Area |
| NXX | Central office code; N can be digits 2–9 and XX can be 00–99 |
| PID | Party identifier (as in calling party identifier or called party identifier) |
| PIN | Personal Identification Number |
| PRI | Primary Rate Interface |
| SCP | Service Control Point |
| SLP | Service Logic Program |
| SQL | Structured Query Language |
| SSP | Service Switching Point |
| STR | SendToResource or Send_To_Resource Message |
| TBD | To Be Determined |
| TDRP | Time Dependent Range Privilege |
| TOD | Time of Day |
| VPN | Virtual Private Network |

What is claimed is:

1. A method of routing a call, comprising:

receiving a number of dialed digits entered by a caller, the dialed digits including a called party number;

recognizing the called party number as a subscriber to a fully flexible routing service;

obtaining a call plan having at least one predetermined routing feature for the subscriber;

obtaining a primary rate interface for the subscriber;

processing the call according to the at least one predetermined routing feature in the call plan;

obtaining a destination number identification service in response to processing the call;

determining whether to overlay the primary interface with the destination number identification service;

determining a destination number according to the primary rate interface alone or with the destination number identification service if so determined; and routing the call to the destination number.

2. The method, as set forth in claim 1, wherein obtaining the call plan comprises obtaining a feature index to a first data structure having data for a first routing feature.

3. The method, as set forth in claim 2, wherein obtaining the call plan comprises obtaining a feature index to a next data structure having data for a next routing feature.

4. The method, as set forth in claim 1, wherein obtaining the call plan comprises obtaining a route index uniquely identifying the call plan.

5. The method, as set forth in claim 1, wherein processing the call comprises:

identifying a first routing feature of the call plan;

accessing a first table having a plurality of entries defining the first routing feature;

determining a tentative destination number;

identifying a next routing feature of the call plan;

overwriting or maintaining the tentative destination number according to the next routing feature; and repeatedly processing the call with the next routing feature until the call plan is completed.

6. The method, as set forth in claim 1, wherein obtaining the call plan comprises:

identifying a route index specifying a particular call plan;

identifying a feature index specifying a particular entry in a feature table; and identifying a feature type specifying a first routing feature.

7. The method, as set forth in claim 1, wherein routing the call comprises:

obtaining a destination number translated from the dialed digits; and obtaining a switch and a trunk group for routing the call to the destination number.

8. The method, as set forth in claim 1, wherein obtaining a call plan comprises obtaining a call plan comprising a time dependent routing feature.

9. The method, as set forth in claim 1, wherein obtaining a call plan comprises obtaining a call plan comprising a time of day routing feature.

10. The method, as set forth in claim 1, wherein obtaining a call plan comprises obtaining a call plan comprising a day of week routing feature.

11. The method, as set forth in claim 1, wherein obtaining a call plan comprises obtaining a call plan comprising a day of year routing feature.

12. The method, as set forth in claim 1, wherein obtaining a call plan comprises obtaining a call plan comprising a geographic dependent routing feature.

13. The method, as set forth in claim 1, wherein obtaining a call plan comprises obtaining a call plan comprising a predetermined distribution feature.

14. The method, as set forth in claim 1, wherein obtaining a call plan comprises obtaining a call plan comprising a sequential quota routing feature.

15. The method, as set forth in claim 1, wherein obtaining a call plan comprises obtaining a call plan comprising a round robin quota routing feature.

16. The method, as set forth in claim 1, wherein obtaining a call plan comprises obtaining a call plan comprising a percent allocation routing feature.

17. A fully flexible method of routing a call to a service subscriber, comprising:

obtaining a call plan having a plurality of routing features designed for the subscriber, wherein the plurality of routing features includes one of a time dependent, time of day, day of week, day of year, geographic dependent, predetermined distribution, sequential quota, round robin quota, or percent allocation routing feature;

obtaining a PRI for the subscriber;

process the call according to the plurality of routing features in the call plan and obtaining a DNIS; and routing the call to a destination number in response to the PRI and DNIS.

18. The method, as set forth in claim 17, wherein obtaining the call plan comprises:

obtaining a feature index to a first data structure having data for a first routing feature; and obtaining a feature index to a next data structure having data for a next routing feature.

19. The method, as set forth in claim 17, wherein obtaining the call plan comprises obtaining a route index uniquely identifying the call plan.

20. The method, as set forth in claim 17, wherein processing the call comprises:
   identifying a first routing feature of the call plan;
   accessing a first table having a plurality of entries defining the first routing feature;
   determining a tentative destination number;
   identifying a next routing feature of the call plan;
   overwriting or maintaining the tentative destination number according to the next routing feature; and
   repeatedly processing the call with the next routing feature until the call plan is completed.

21. The method, as set forth in claim 17, wherein obtaining the call plan comprises:
   identifying a route index specifying a particular call plan;
   identifying a feature index specifying a particular entry in a feature table; and
   identifying a feature type specifying a first routing feature.

22. The method, as set forth in claim 17, further comprising obtaining a DNIS which may be used to overlay the destination number.

23. The method, as set forth in claim 17, wherein routing the call comprises:
   obtaining a destination number translated from the dialed digits; and
   obtaining a switch and a trunk group for routing the call to the destination number.

24. A fully flexible method of routing a call to a service subscriber, comprising:
   obtaining a call plan having a plurality of routing features designed for the subscriber;
   obtaining a PRI for the subscriber;
   process the call according to the plurality of routing features in the call plan and obtaining a DNIS; and
   routing the call to a destination number in response to the PRI and DNIS, wherein obtaining a call plan comprises obtaining a call plan comprising a time dependent routing feature.

25. The method, as set forth in claim 24, wherein obtaining a call plan comprises obtaining a call plan alternatively comprising a time of day routing feature.

26. The method, as set forth in claim 24, wherein obtaining a call plan comprises obtaining a call plan alternatively comprising a day of week routing feature.

27. The method, as set forth in claim 24, wherein obtaining a call plan comprises obtaining a call plan alternatively comprising a day of year routing feature.

28. The method, as set forth in claim 24, wherein obtaining a call plan comprises obtaining a call plan alternatively comprising a geographic dependent routing feature.

29. The method, as set forth in claim 24, wherein obtaining a call plan comprises obtaining a call plan alternatively comprising a predetermined distribution feature.

30. The method, as set forth in claim 24, wherein obtaining a call plan comprises obtaining a call plan alternatively comprising a sequential quota routing feature.

31. The method, as set forth in claim 24, wherein obtaining a call plan comprises obtaining a call plan alternatively comprising a round robin quota routing feature.

32. The method, as set forth in claim 24, wherein obtaining a call plan comprises obtaining a call plan alternatively comprising a percent allocation routing feature.

33. A fully flexible method of routing a call to a service subscriber, comprising:
   obtaining a call plan having a plurality of routing features designed for the subscriber;
   obtaining a PRI for the subscriber;
   process the call according to the plurality of routing features in the call plan and obtaining a DNIS, the call plan comprising:
      determining a tentative DNIS in response to the time of the call;
      determining a tentative DNIS in response to the geographic location of the caller; and
      determining a tentative DNIS in response to a predetermined call distribution scheme; and
   routing the call to a destination number in response to the PRI and tentative DNIS.

* * * * *